(12) United States Patent
Janzer

(10) Patent No.: US 12,282,162 B2
(45) Date of Patent: Apr. 22, 2025

(54) WAVEGUIDE-BASED PROJECTION DISPLAY DEVICE WITH A DYNAMIC SCATTERED LIGHT ABSORBER FOR A VEHICLE

(71) Applicant: Bayerische Motoren Werke Aktiengesellschaft, Munich (DE)

(72) Inventor: Michael Arthur Janzer, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/038,483

(22) PCT Filed: Oct. 8, 2021

(86) PCT No.: PCT/EP2021/077915
§ 371 (c)(1),
(2) Date: May 24, 2023

(87) PCT Pub. No.: WO2022/156923
PCT Pub. Date: Jul. 28, 2022

(65) Prior Publication Data
US 2024/0012240 A1    Jan. 11, 2024

(30) Foreign Application Priority Data

Jan. 22, 2021    (DE) .................... 10 2021 101 432.8

(51) Int. Cl.
*G02B 27/01*    (2006.01)
*F21V 8/00*    (2006.01)
(Continued)

(52) U.S. Cl.
CPC ......... *G02B 27/0101* (2013.01); *G02B 5/003* (2013.01); *G02B 6/005* (2013.01);
(Continued)

(58) Field of Classification Search
CPC ............ G02B 27/0101; G02B 27/0093; G02B 27/0081; G02B 5/003; G02B 6/005;
(Continued)

(56) References Cited

U.S. PATENT DOCUMENTS 10,747,314 B1*    8/2020    Chang ..................... G06F 3/013
2019/0227313 A1*    7/2019    Lambert ............ G02B 27/0149
(Continued)

FOREIGN PATENT DOCUMENTS

DE    10 2019 205 138 A1    10/2019
JP    6-199150 A    7/1994
(Continued)

OTHER PUBLICATIONS

Translation of WO 2019/238849 (Year: 2019).*
(Continued)

*Primary Examiner* — Christopher E Leiby
(74) *Attorney, Agent, or Firm* — Crowell & Moring LLP

(57) ABSTRACT

A projection display device includes an imaging unit; a planar waveguide with a light decoupling face for a light beam bundle produced by the imaging unit; an at least partially transparent reflection plate arranged in the field of view of a user and configured to reflect a light beam bundle decoupled from the waveguide to an eyebox predetermined for the user's eyes; an eye-tracking device configured to determine an eyebox window which is currently occupied by the user's eyes; and a dynamic scattered light absorber, which, to shadow the light decoupling face in a surface portion which is dynamically adjustable depending on a signal of the eye-tracking device and which extends starting from at least one of the edges of the light decoupling surface, is configured to at least partially limit the decoupled light beam bundle to the current eyebox window.

13 Claims, 3 Drawing Sheets

(51) Int. Cl.
*G02B 5/00* (2006.01)
*G02B 27/00* (2006.01)
(52) U.S. Cl.
CPC .. *G02B 27/0093* (2013.01); *G02B 2027/0138* (2013.01); *G02B 2027/0196* (2013.01)
(58) Field of Classification Search
CPC .... G02B 2027/0138; G02B 2027/0196; G02B 2027/0187; B60K 35/23
See application file for complete search history.

(56) References Cited

U.S. PATENT DOCUMENTS

| | | | | |
|---|---|---|---|---|
| 2020/0073120 A1* | 3/2020 | von Spiegel | ....... | G02B 27/0093 |
| 2020/0319456 A1* | 10/2020 | Yatsu | ................. | G02B 17/0621 |
| 2020/0320960 A1* | 10/2020 | Yamase | ................... | G02B 27/01 |
| 2021/0096365 A1 | 4/2021 | Habermehl et al. | | |

FOREIGN PATENT DOCUMENTS

| | | | | | |
|---|---|---|---|---|---|
| JP | 2010-97193 A | | 4/2010 | | |
| JP | WO2017134865 | * | 8/2017 | ......... | G02B 27/0101 |
| JP | WO 2020/158054 | * | 10/2019 | ......... | G02B 27/0101 |
| WO | WO 2014/171280 A1 | | 10/2014 | | |
| WO | WO 2019/238846 A | | 12/2019 | | |
| WO | WO 2019/238854 A1 | | 12/2019 | | |
| WO | WO 2019/238877 A1 | | 12/2019 | | |
| WO | WO2019238849 | * | 12/2019 | ......... | G02B 27/0103 |
| WO | WO 2020/047486 A1 | | 3/2020 | | |
| WO | WO 2020/049542 A1 | | 3/2020 | | |

OTHER PUBLICATIONS

Translation of WO 2017134865 (Year: 2017).*
International Search Report (PCT/ISA/210) issued in PCT Application No. PCT/EP2021/077915 dated Jan. 31, 2022 with English translation (6 pages).
German-language Written Opinion (PCT/ISA/237) issued in PCT Application No. PCT/EP2021/077915 dated Jan. 31, 2022 (6 pages).
German-language Search Report issued in German Application No. 10 2021 101 432.8 dated Jun. 25, 2021 with partial English translation (11 pages).

* cited by examiner

WAVEGUIDE-BASED PROJECTION DISPLAY DEVICE WITH A DYNAMIC SCATTERED LIGHT ABSORBER FOR A VEHICLE

BACKGROUND AND SUMMARY OF THE INVENTION

The invention relates to a waveguide-based projection display device, which may be used particularly in a motor vehicle or a different type of vehicle. The projection display device is configured to generate a virtual display image, which is overlaid in the field of view of a user, by way of reflection from an at least partially transparent reflection pane, in particular a windshield of the vehicle. The projection display device is in this case based on a waveguide in order to generate a relatively large virtual display image in a small installation space. The invention also concerns a method for operating the projection display device as well as a vehicle equipped therewith.

Projection display devices are known particularly under the designation head-up display (HUD). In a motor vehicle, for example, a desired display content, for instance information relating to a speed limit or other useful navigation and vehicle operating instructions, or entertainment contents, may thus be overlaid in the form of a virtual display image on the image of the real environment observed by the driver or another occupant in front of the vehicle. For this purpose, a projection display device in the conventional design comprises a display with suitable imaging and projection optics, which is fitted below an upper side of the dashboard, in order to generate a beam of light rays with a desired display content and project it onto the windshield of the motor vehicle or onto a combiner pane provided separately in front of it, in such a way that it is reflected from the windshield or combiner pane toward the user in order to make the virtual display image appear in their field of view in front of or behind the reflection pane.

As an alternative to this conventional HUD design, the imaging and projection optics of which typically comprise a concave mirror in the beam path after the display, the size of which mirror scales linearly with the HUD image, a HUD design with a large-area planar waveguide (optical waveguide) is known particularly for AR (augmented reality) applications. By the use of a planar waveguide, the installation space required for the HUD in relation to the size of the virtual display image can be reduced significantly in comparison with the conventional HUD design.

However, a head-up display that uses a waveguide in order to display a large HUD image in a small installation space will exhibit a very different scattered light behavior in comparison with a conventional HUD. While in the conventional HUD the scattered light primarily originates from the imaging unit in the form of an LCD (liquid-crystal display), DMD (digital micromirror device) or LCOS (liquid crystal on silicon), in a waveguide HUD there are two sources of scattered light: on the one hand the imaging unit (picture generating unit, PGU), which generates a usually collimated beam of light rays with a display content, and on the other hand the waveguide itself, in which the generated beam of light rays is guided and coupled out toward the windshield. This additional source of scattered light is particularly noticeable in the currently most technologically advanced waveguide variant, since in this case the waveguide contains holographic structures that are used for light steering and, because of their material properties, typically have a tendency toward increased scattering.

This usually leads to a negative effect, namely that the entire light output coupling surface of the waveguide appears as a diffusely luminous surface. This diffusely luminous surface is reflected via the windshield into the driver's eye and therefore covers the road scene in front (cf. FIGS. 1 and 2).

During the day, this scattered light generally does not represent a problem. At night, however, especially when driving cross country on flat terrain, the scattered light may have a disruptive effect. The region below the horizon is illuminated by the low beam of the vehicle, so that the driver is more tolerant to scattered light of the HUD in this region. The region above the horizon, however, is much more critical: this is because the driver has a particularly dark background here, in which the scattered light is particularly conspicuous to them. In the worst case, the driver may even have the impression of driving through fog. Especially for short and medium-height drivers, the region of the scattered light may be raised far beyond the horizon.

It is an object of the present invention to provide a waveguide-based projection display device, with which it is possible to reduce or even eliminate the explained scattered light effect in the field of view of the user, particularly in the region above the horizon. In particular, the suitability of the projection display device for use in a motor vehicle or another land, air or water vehicle for the purposes mentioned in the introduction may thereby be improved.

This object is achieved by a waveguide-based projection display device, by an associated operating method, a corresponding control unit and a vehicle equipped therewith according to the claimed invention. All further features and effects mentioned in the claims and the following description for the projection display device also apply in relation to their operating method, the control unit and the vehicle, and vice versa.

According to a first aspect, a waveguide-based projection display device is provided, which may in particular be configured for use in a motor vehicle or any other land, air or water vehicle. The projection display device may, in particular, be a head-up display (HUD).

The projection display device in this case comprises a flat, in particular planar, waveguide (optical waveguide). In one of its two flat sides, the waveguide has a light output coupling surface, configured with a large area for one-dimensional or two-dimensional eyebox expansion, for light that is coupled into the waveguide laterally, in particular at an end side of the waveguide, during operation of the projection display device. The projection display device furthermore comprises a picture generating unit (or PGU), which is configured to generate a beam of light rays with a desired display content and to couple it into the waveguide.

The projection display device furthermore comprises an at least partially transparent reflection pane, which is arranged in the field of view of a user and is configured to reflect a beam of light rays coupled out from the waveguide toward an eyebox intended for their eyes, in such a way that a virtual display image is formed in the field of view of the user in front of or behind the reflection pane.

The eyebox may be understood here in particular as a two-dimensional spatial region perpendicular to the beam propagation direction. The eyebox position in the beam propagation direction may for example be defined by the distance from the reflection pane, the user being able to see the virtual display image with unaltered good quality even in the event of head movements through, for example, about 15 cm toward the reflection pane or away from it. The reflection pane may, in particular, be formed by a windshield of the vehicle.

The projection display device furthermore comprises an eye tracking instrument, which is configured to ascertain an eyebox window currently occupied by the eyes of the user, which has a predetermined size, that is to say a partial surface, inside the eyebox. While the total surface of the eyebox may correspond for example to a total cross section of the beam of light rays that is coupled out from the light output coupling surface and is reflected toward the user, the so-called eyebox window represents only a partial region of the eyebox, which may for example cover only a fraction (for example less than one tenth, less than one fourth or less than one half) of the total surface of the eyebox and the position of which may depend inter alia on the body size and the respective pose of the user. Depending on the accuracy of the eye tracking, the predetermined size of the eyebox window may vary and, for example, be established with a height in the range of about 20 mm and a suitable width in the range of about 100 mm, with a rectangular shape.

In order to achieve the scattered light problem explained in the introduction, the projection display device of the type presented here has a dynamic scattered light absorber. The latter is configured to shade the light output coupling surface—and therefore the scattered light emerging from the light output coupling surface during operation of the projection display device—in a surface segment that is dynamically adjustable as a function of a signal of the eye tracking instrument and extends respectively from at least one of the edges of the light output coupling surface, in order to restrict the beam of light rays coupled out at least partially in its cross section to the ascertained eyebox window.

For this purpose, the projection display device may for example comprise a suitable control unit, which receives an eye tracking signal from the eye tracking instrument, optionally evaluates it in order to ascertain the eyebox window currently occupied by the eyes of the user, and actuates the dynamic scattered light absorber as a function thereof, in such a way that the cross section of the beam of light rays coupled out from the light output coupling surface is at least partially reduced peripherally, the respectively currently ascertained eyebox window always remaining fully illuminated.

In this way, the undesired scattered light mentioned in the introduction that can emerge from the light output coupling surface of the waveguide, which is disruptive particularly in darkness, can be at least partially blocked out in the cross-sectional regions of the beam of light rays that do not contribute to the image generation for the respective eye position of the user. Depending on the accuracy of the position detection of the eyes and the configuration of the dynamic scattered light absorber, the scattered light region may in this case be reduced significantly and in the best case entirely eliminated, by the beam of light rays being reduced in cross section to such an extent that it subsequently illuminates only the eyebox window actually needed for the display image generation. In this way, an edge that is generated by the disruptive scattered light, which the user would see in darkness around the virtual display image represented in the absence of the dynamic scattered light absorber proposed here, may be partially to fully eliminated.

The dynamic scattered light absorber may in principle be arranged at any desired position in the beam path of the light coupled out from the waveguide, and arrangement in or directly over the light output coupling surface may be particularly favorable if only for reasons of space, depending on the specific embodiment. The dynamic scattered light absorber may in this case cover the light output coupling surface in a dynamically adjustable region in order to block out the scattered light in this region.

According to one embodiment, the surface segment shaded by the dynamic scattered light absorber extends from a near-user edge of the light output coupling surface inward along the light output coupling surface, so that an upper eyebox edge segment above the eyebox window can be shaded. With this embodiment, the scattered light problem mentioned in the introduction may be resolved above the horizon in the field of view of the user. In addition, the light output coupling surface may also be dynamically shaded in surface segments starting from other edges.

In one specific configuration, the dynamic scattered light absorber comprises at least one roller blind, which can be automatically extended over or along the light output coupling surface from at least one of the edges of the latter inward, so as in this way to shade the corresponding cross-sectional segment of the beam of light rays coupled out. Such a roller blind may for example be provided or used simultaneously for other purposes, for example to protect against misuse and/or to protect the light output coupling surface when the projection display device is not being used.

In one specific configuration, the dynamic scattered light absorber is configured as a two-dimensional matrix of elements that can respectively be switched between a transmitting state and an absorbing state for the light coupled out from the waveguide—that is to say both for the useful light used for the image generation and for the disruptive scattered light. The matrix may extend along the entire light output coupling surface, or at least in the edge region thereof.

In this configuration, the dynamic scattered light absorber may for example be configured as a liquid-crystal matrix (LC matrix) having at least one polarization filter for switching its elements between a light-transmissive state and a light-blocking state. In this way, in particular, rapid switching times of the matrix elements may be achieved. For example, two polarization filters having crossed, in particular mutually orthogonal, polarization directions may in this case be provided on either side of the LC matrix. Nevertheless, a single polarization filter on an upper side of the matrix, facing toward the reflection pane, may also be sufficient if the light coupled out from the waveguide is already adequately polarized. Alternatively, the matrix may for example also be configured as an electrochromic matrix.

The individual switchable elements of the matrix may in this case have in particular linear dimensions of between about 1 mm and about 40 mm, for example be configured as a square or rectangle having a side length in this range.

The eye tracking instrument may for example comprise at least one camera, which is configured for optical recording of the eyebox.

According to another aspect, a method for operating a projection display device of the type presented here is provided. The method in this case comprises the following steps:
  generating a beam of light rays by the imaging unit and coupling this beam of light rays into the waveguide;
  acquiring an eye tracking signal from the eye tracking instrument and ascertaining therefrom an eyebox window currently occupied by the eyes of the user inside the eyebox; and
  adjusting the dynamic scattered light absorber as a function of the eye tracking signal or of the ascertained eyebox window, in such a way that the beam of light rays coupled out from the waveguide is at least partially restricted in its cross section to the ascertained eyebox window.

According to another aspect, a control unit (already mentioned above) for operating a projection display device of the type presented here is provided, which is configured and adapted to carry out such a method automatically.

According to another aspect, a vehicle, in particular a motor vehicle or any other land, air or water vehicle, is provided. The vehicle comprises a windshield and a dashboard arranged underneath. The vehicle furthermore comprises a projection display device of the type presented here, the reflection pane of which is formed by the windshield or a combiner pane arranged in front of the latter inside the vehicle, and the waveguide of which extends with its flat side, in which the light output coupling surface is formed, in or along an upper side of the dashboard (in particular ending flush with it). The vehicle furthermore comprises a control unit of the type presented here.

In summary: the scattered light in the head-up display (HUD) of a motor vehicle has always received particular attention in HUD development. It has a disruptive and fatiguing effect especially at night, since it reduces the contrast of the road scene. With the arrival of waveguide-based AR-HUDs and the associated larger HUD images, this topic has gained even more importance. The dynamic scattered light absorber proposed here makes it possible to eliminate the scattered light particularly in the region above the horizon, where it can be particularly disruptive in darkness, and therefore to offer the user a particularly good and safe driving experience.

The above aspects of the invention and the embodiments and specific configurations thereof will be explained in more detail below with the aid of the examples represented in the appended drawings. The drawings are at least in part kept purely schematic for reasons of clear representation: they are therefore generally not to be regarded as true to scale.

DETAILED DESCRIPTION OF THE DRAWINGS

All the various embodiments, variants and specific configuration features of the projection display device, of the method, of the control unit and of the vehicle according to the above aspects of the invention, which are mentioned above in the description and in the following claims, may be implemented in the examples shown in FIGS. 1 to 6. They are therefore not all repeated in what follows. The same applies accordingly for the term definitions and effects already indicated above in relation to individual features that are shown in FIG. 1-6.

Figure 1:
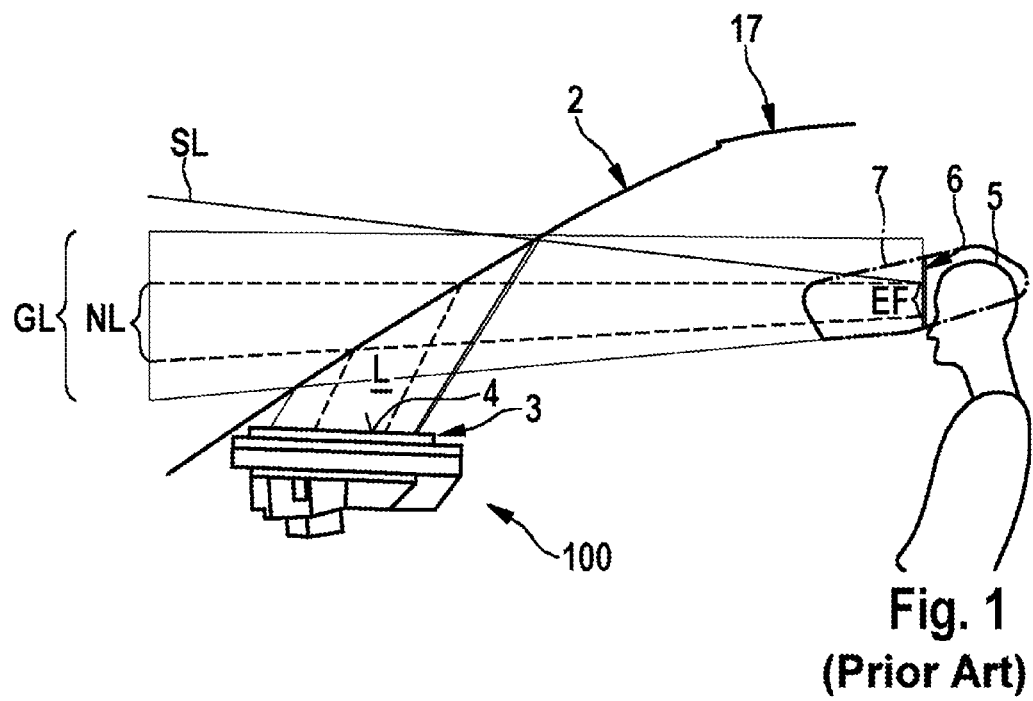
FIG. 1 shows a lateral cross-sectional view of a vehicle having a waveguide-based projection display device according to the prior art, a beam path of the scattered light being shown in addition to the beam path of the useful light.

FIG. 1 shows a highly simplified schematic lateral cross-sectional view of an example of a motor vehicle 17 having a waveguide-based projection display device 100 according to the prior art. It may in particular be a head-up display (HUD) for augmented reality applications (AR-HUD).

The motor vehicle 17 comprises a windshield 2 and a dashboard arranged underneath, in the upper side of which the projection display device 100 is arranged.

The projection display device 100 of FIG. 1 comprises, in a manner known per se, a planar waveguide 3 (optical waveguide) which, in its flat side facing toward the windshield, has a light output coupling surface 4 for light that is coupled into the waveguide 3 laterally, in particular at an end side of the waveguide 3. For this purpose, the projection display device 100 comprises a picture generating unit (or PGU), not separately represented in FIG. 1, which is configured to generate a beam of light rays with a desired display content and to couple it into the waveguide 3.

The windshield 2 is used in the projection display device 100 as a reflection pane, which reflects a beam of light rays L coupled out from the waveguide 3 through the light output coupling surface 4 of the latter toward an eyebox 6 intended for the eyes of a user 5 (here a driver of the motor vehicle), so that a virtual display image V (indicated schematically in FIG. 2) is formed in the field of view of the user 5 behind the windshield 2. The eyebox 6 is to be understood here as a two-dimensional spatial region perpendicular to the beam propagation direction. Even in the event of head movements of the user 5 through, for example, about 10-15 cm forward or backward in the longitudinal direction of the vehicle from the eyebox position shown, they can see the virtual display image V well. A corresponding three-dimensional spatial region 7 around the eyebox 6 is indicated in FIG. 1. This region also accommodates different physical sizes and seat positions of the various users in a vertical direction.

As described in the introduction, in a conventional waveguide HUD there are two sources of scattered light: on the one hand the imaging unit and on the other hand the waveguide 3 itself. This additional source of scattered light may be particularly strongly pronounced in a waveguide 3 with holographic structures that are used for light steering and, because of their material properties, typically have a tendency toward increased scattering.

Figure 2:
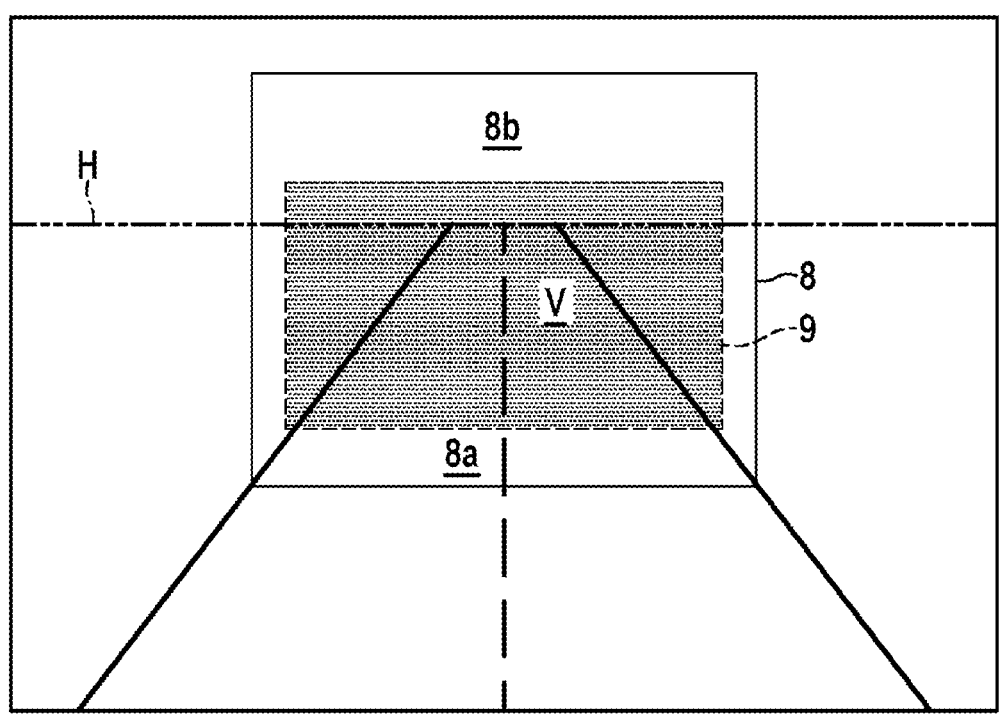
FIG. 2 shows a useful light region and a scattered light region from the viewpoint of a driver of the vehicle of FIG. 1.

As shown in FIG. 1 and FIG. 2 according to the prior art, in conventional projection display devices 100 this leads to a negative effect, namely that the entire light output coupling surface 4 of the waveguide 3 appears as a diffusely luminous surface, which is reflected via the windshield 2 into the eye of the user 6 (here the driver) and therefore covers the road scene in front around the useful light region 9, in which the virtual display image V is represented, in the form of a luminous scattered light region 8.

FIG. 1 shows with the aid of marginal rays the beam volume NL of the useful light, which is used to generate the virtual display image V for the user 5. FIG. 1 furthermore shows the total beam volume GL of the beam of light rays L coupled out, which illuminates the entire eyebox 6, as well as an upper marginal ray SL of the scattered light, which in this case travels starting from the light output coupling surface 4 of the waveguide 3 via the windshield 2 to the eyes of the user 5 and leads to the formation of the scattered light region 8 around the useful light region 9 in which the virtual display image V is represented.

During the day, this scattered light generally does not represent a problem. At night, however, especially when driving cross country on flat terrain, the scattered light may have a disruptive effect. The scattered light region 8a below the horizon H is illuminated by the low beam of the vehicle, so that the driver is more tolerant to scattered light of the HUD in this region. The scattered light region 8b above the horizon H, however, is much more critical: this is because the driver often has a particularly dark background here, in which the scattered light is particularly conspicuous to them. In the worst case, the driver may even have the impression of driving through fog. Especially for short and medium-height drivers, the scattered light region 8b may be raised far beyond the horizon H.

Figure 3:
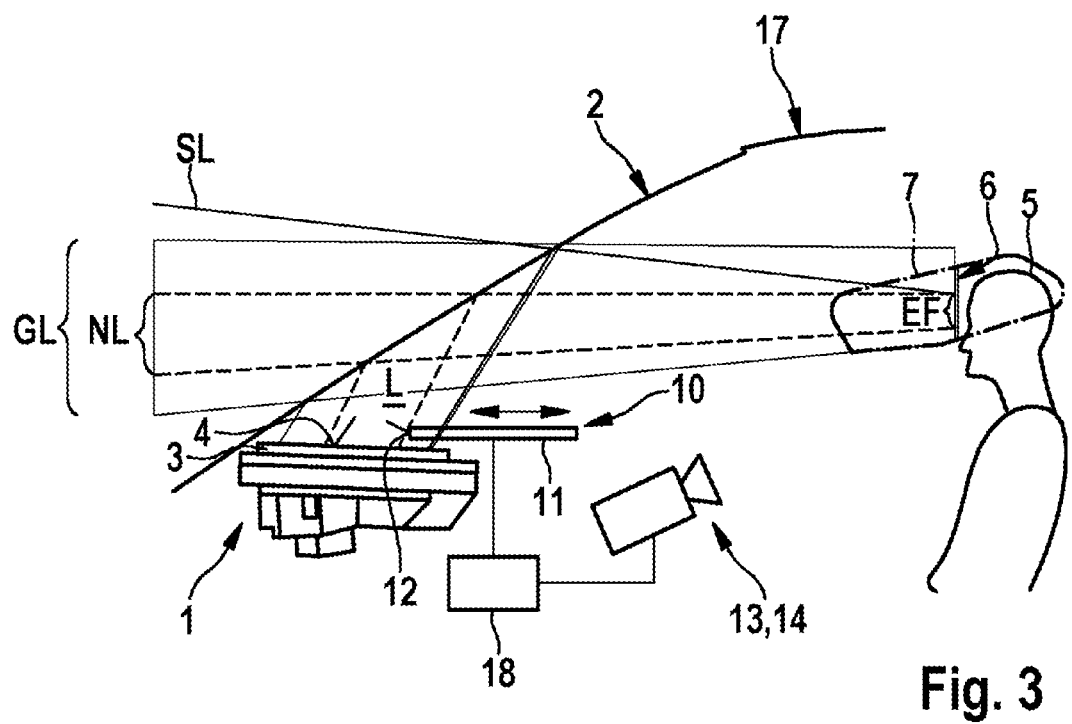
FIG. 3 shows a lateral cross-sectional view of a vehicle having a waveguide-based projection display device of the type presented here, in which the beam path of the scattered light is blocked by a dynamic scattered light absorber starting from the near-user edge of the waveguide.

FIG. 3 shows a lateral cross-sectional view of a vehicle having a waveguide-based projection display device 1 of the type presented here, in which the beam path of the scattered light is blocked by a dynamic scattered light absorber 10 starting from the near-user edge 11 of the light output coupling surface 4. The elements of the device 1 that are denoted by the same references may in this case be configured in a similar way as in FIGS. 1 and 2.

Figure 4:
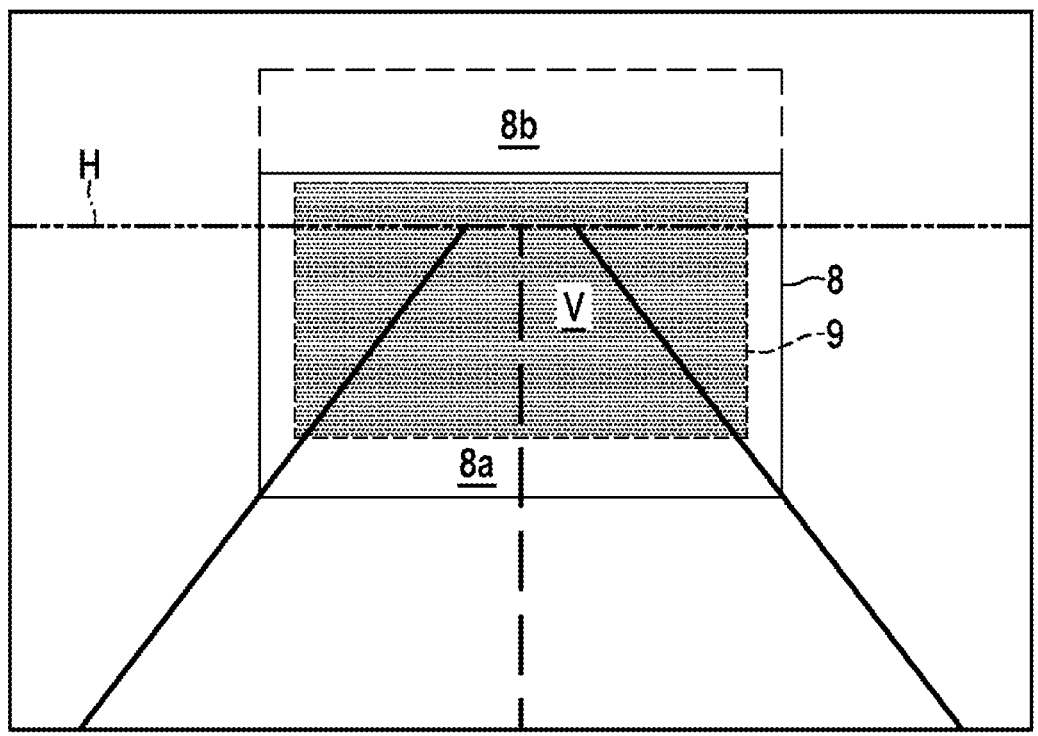
FIG. 4 shows a useful light region and a scattered light region from the viewpoint of a driver of the vehicle of FIG. 3, a scattered light region above the horizon being eliminated by the dynamic scattered light absorber.

FIG. 4 shows the useful light region 9 and the scattered light region 8 from the viewpoint of the user 5 (a driver of the vehicle) of FIG. 3, a scattered light region 8b that lies above the horizon H being eliminated by the dynamic scattered light absorber 10 by the corresponding shading of the beam path of the scattered light.

The scattered light problem (above the horizon H) is in this case resolved by a dynamically adjustable scattered light absorber 10, which, as represented in FIG. 3 by an arrow, is dynamically displaceable along the longitudinal axis of the vehicle in order always to achieve optimal shading of the scattered light, without clipping the HUD image V. The correct position of a front edge 12 of the dynamic scattered light absorber 10 is in this case determined by the position of the eyes of the user 5, which is detected by way of a camera 13 of a suitable eye tracking instrument 14.

One possible embodiment of the dynamic scattered light absorber 10 is, for example, as a roller blind that is located on a near-user rear edge 15 of the projection display device 1 and can be extended over and along the light output coupling surface 4 inward from the near-user edge 11 of the latter.

In this way, an upper eyebox edge segment 6b above an eyebox window EF actually being used by the eyes of the user 5 is shaded. At the same time, however, the beam path of the scattered light with the marginal ray SL is also blocked, which is indicated in FIGS. 3 and 4 by being deleted (that is to say no longer present).

The scattered rays are thus blocked by the dynamic scattered light absorber 10 during the operation of the device 1 as a function of a respectively current signal of the eye tracking instrument 14. The camera 13 of the latter delivers the required data basis by way of the eye tracking in order to correctly adjust the position of the front absorber edge 12 (away from the user) so that the eyebox window EF currently being used by the user 5 is not clipped. Automatic performance of these steps may be implemented in a suitable control unit 18, which receives signals of the eye tracking instrument 14 during operation and drives the dynamic scattered light absorber 10 accordingly.

The positive effect on the scattered light may be seen in FIG. 4. Depending on the accuracy of the position detection of the eyes, the upper scattered light region 8b may in the best case be reduced to the useful light region 9, in which the virtual display image V is represented (HUD image region).

Figure 5:
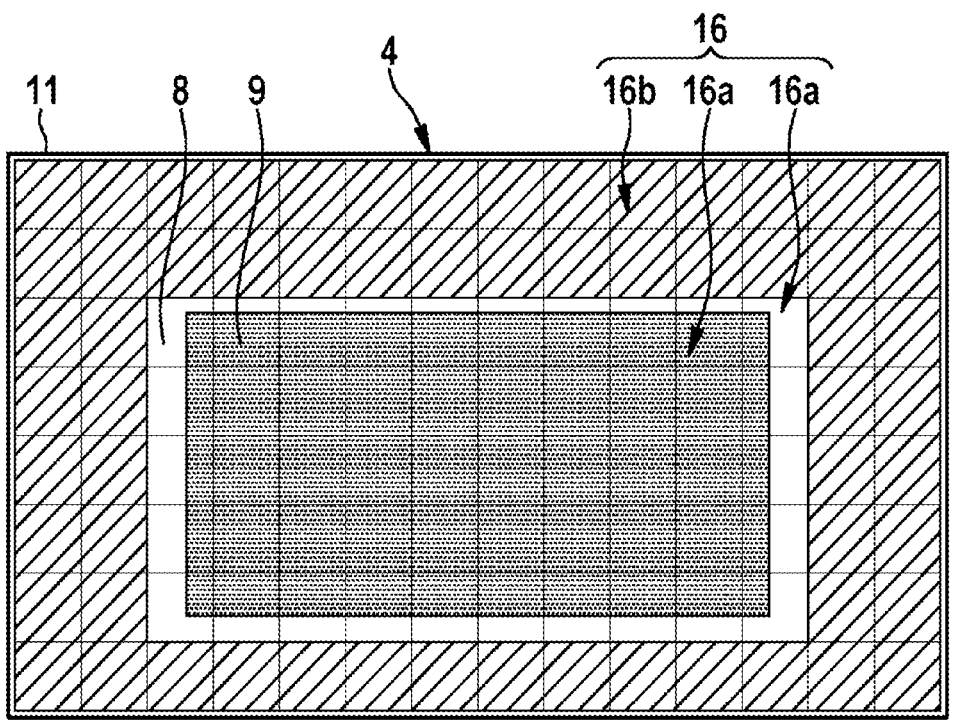
FIG. 5 shows a plan view of a light output coupling surface of a waveguide of a further waveguide-based projection display device of the type presented here, in which the beam path of the scattered light is blocked by a dynamic scattered light absorber in the form of a matrix of switchable elements.

FIG. 5 shows another embodiment of the dynamic scattered light absorber 10 of a waveguide-based projection display device 1 of the type presented here. In this case, the dynamic scattered light absorber 10 constitutes a matrix of elements 16 that can be switched to be light-transmitting (16a) or light-absorbing (16b), for example an LC matrix with a polarizer. The matrix in this example covers the entire light output coupling surface 4 of the waveguide 2, which is shown in a plan view. In other regards, the projection display device 1 may for example be configured in a similar way to that of FIG. 3.

Figure 6:
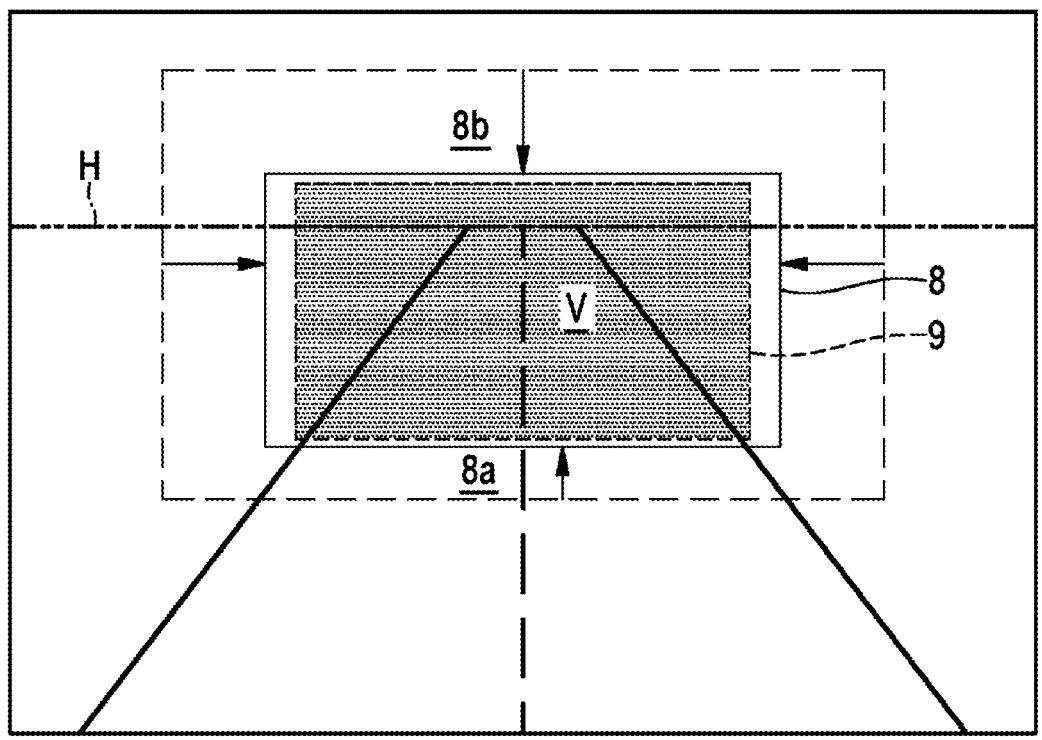
FIG. 6 shows a useful light region and a scattered light region from the viewpoint of a driver of a vehicle having a waveguide-based projection display device according to FIG. 5, a scattered light region around the HUD image being blocked on all sides by the dynamic scattered light absorber.

This embodiment of the dynamic scattered light absorber 10 may have the advantage over FIG. 3 that not only the scattered light region 8b above the HUD image can be freed from the scattered light, but also the scattered light could be eliminated in the entire scattered light region 8 around the useful light region 9 currently being used for the virtual display image V, as shown in FIG. 6 from the viewpoint of the user 5.

The LC-based embodiment with a polarizer on the upper side also has further advantages, such as known technology, rapid switching times or good transmission. As an alternative to an LC matrix, an electrochromic matrix may also be employed. The individual switchable matrix elements 16 may, for example, have linear dimensions of about more than 1 mm to about less than 40 mm in FIG. 5.

LIST OF REFERENCES 1, 100 waveguide-based projection display device
2 windshield
3 waveguide
4 light output coupling surface
5 user
6 eyebox (two-dimensional)
7 three-dimensional spatial region from which the virtual display image may be seen
8 scattered light region from the viewpoint of the user
9 useful light region from the viewpoint of the user
L beam of light rays coupled out
V virtual display image
NL beam volume of the useful light, which contributes to the display image generation for the user
GL the total beam volume of the beam of light rays coupled out, which illuminates the entire eyebox
SL upper marginal ray of the scattered light
H horizon
EF eyebox window which is currently occupied by the eyes of the user
8a scattered light region below the horizon
8b scattered light region above the horizon
10 dynamic scattered light absorber
11 near-user edge of the light output coupling surface
12 front edge of the dynamic scattered light absorber in the longitudinal direction of the vehicle 13 camera
14 eye tracking instrument
15 near-user rear edge of the projection display device
16 matrix element
16a light-transmitting
16b light-absorbing
17 motor vehicle
18 control unit

The invention claimed is:

1. A waveguide-based projection display device for use in a vehicle, the projection display device comprising:
    an imaging unit;
    a flat waveguide having a light output coupling surface formed in a flat side for a beam of light rays generated by the imaging unit, which are couplable into the waveguide laterally;
    an at least partially transparent reflection pane, which is arranged in a field of view of a user and is configured to reflect a beam of light rays coupled out from the waveguide toward an eyebox intended for eyes of the user, such that a virtual display image is formed in the field of view of the user behind the reflection pane;
    an eye tracking instrument, which is configured to ascertain an eyebox window currently occupied by the eyes of the user, wherein the eyebox window has a predetermined size inside the eyebox; and
    a dynamic scattered light absorber, which is configured to shade the light output coupling surface in a surface segment that is dynamically adjustable as a function of the eyebox window and extends respectively from at least one edge of edges of the light output coupling surface, so that the beam of light rays coupled out from the waveguide is restricted at least partially in its cross section to the eyebox window and the eyebox window is fully illuminated.

2. The projection display device according to claim 1, wherein the light rays are couplable into the waveguide through an end side of the waveguide.

3. The projection display device according to claim 1, wherein the reflection pane is a windshield of the vehicle.

4. The projection display device according to claim 1, wherein
    the surface segment shaded by the dynamic scattered light absorber extends at least from a near-user edge of the light output coupling surface inward along the light output coupling surface, so that an upper eyebox edge segment above the eyebox window is shaded.

5. The projection display device according to claim 1, wherein
    the dynamic scattered light absorber comprises at least one roller blind, which is extendable over and along the light output coupling surface from at least one edge of the edges of the light output coupling surface inward, to shade a corresponding cross-sectional segment of the beam of light rays coupled out from the waveguide.

6. The projection display device according to claim 1, wherein
    the dynamic scattered light absorber is configured as a matrix, arranged along the light output coupling surface at least in an edge region of the light output coupling surface, of elements that are switchable between a transmitting state and an absorbing state for the beam of light rays coupled out from the waveguide.

7. The projection display device according to claim 6, wherein the dynamic scattered light absorber is configured as
    a liquid-crystal matrix having a polarizer on its upper side facing toward the reflection pane, or
    an electrochromic matrix.

8. The projection display device according to claim 6, wherein
    individual switchable elements of the matrix have linear dimensions of between about 1 mm and about 40 mm.

9. The projection display device according to claim 1, wherein
    the eye tracking instrument comprises a camera, which is configured for optical recording of the eyebox.

10. A method for operating the projection display device according to claim 1, the method comprising:
    generating the beam of light rays by the imaging unit and coupling the beam of light rays into the waveguide;
    acquiring an eye tracking signal from the eye tracking instrument and ascertaining from the eye tracking signal the eyebox window currently occupied by the eyes of the user inside the eyebox; and
    adjusting the dynamic scattered light absorber as a function of the eyebox window, such that the beam of light rays coupled out from the waveguide is at least partially restricted in its cross section to the eyebox window and the eyebox window is fully illuminated.

11. A control unit for operating the projection display device according to claim 1, wherein the control unit is configured to automatically carry out a method comprising:
    generating the beam of light rays by the imaging unit and coupling the beam of light rays into the waveguide;
    acquiring an eye tracking signal from the eye tracking instrument and ascertaining from the eye tracking signal the eyebox window currently occupied by the eyes of the user inside the eyebox; and
    adjusting the dynamic scattered light absorber as a function of the eyebox window, such that the beam of light rays coupled out from the waveguide is at least partially restricted in its cross section to the eyebox window and the eyebox window is fully illuminated.

12. A vehicle comprising:
    a windshield;
    a dashboard arranged underneath the windshield;
    a projection display device according to claim 1, wherein the reflection pane is formed by a windshield or a combiner pane arranged in front of the windshield inside the vehicle, and the waveguide extends with the flat side, in which the light output coupling surface is formed, in or along an upper side of a dashboard; and
    a control unit configured to automatically carry out a method comprising:
    generating the beam of light rays by the imaging unit and coupling the beam of light rays into the waveguide;
    acquiring an eye tracking signal from the eye tracking instrument and ascertaining from the eye tracking signal the eyebox window currently occupied by the eyes of the user inside the eyebox; and
    adjusting the dynamic scattered light absorber as a function of the eyebox window, such that the beam of light rays coupled out from the waveguide is at least partially restricted in its cross section to the eyebox window and the eyebox window is fully illuminated.

13. The vehicle according to claim 12, wherein the vehicle is a motor vehicle.

* * * * *